(12) United States Patent
Visconti

(10) Patent No.: US 8,322,740 B1
(45) Date of Patent: Dec. 4, 2012

(54) ELLIPTICAL STROLLER ASSEMBLY

(76) Inventor: Pier Paolo Visconti, Miami Beach, FL (US)

( * ) Notice: Subject to any disclaimer, the term of this patent is extended or adjusted under 35 U.S.C. 154(b) by 168 days.

(21) Appl. No.: 13/045,255

(22) Filed: Mar. 10, 2011

(51) Int. Cl.
*B62K 27/00* (2006.01)

(52) U.S. Cl. ............. 280/221; 280/204; 280/47.38

(58) Field of Classification Search .............. 280/221, 280/204
See application file for complete search history.

(56) References Cited

U.S. PATENT DOCUMENTS

| | | | | |
|---|---|---|---|---|
| 1,059,466 | A * | 4/1913 | Kirch | 280/202 |
| 1,661,257 | A * | 3/1928 | Kirch | 280/202 |
| 4,770,431 | A * | 9/1988 | Kulik | 280/202 |
| 6,341,791 | B1 * | 1/2002 | Cannon, Sr. | 280/204 |
| 6,851,693 | B2 * | 2/2005 | Haeggberg | 280/204 |
| 7,261,308 | B2 * | 8/2007 | Gwisdalla et al. | 280/212 |
| 7,992,889 | B2 * | 8/2011 | Ehrenreich et al. | 280/648 |
| 8,096,569 | B2 * | 1/2012 | Horovitz | 280/287 |
| 2006/0261575 | A1 * | 11/2006 | Ehrenreich et al. | 280/643 |
| 2010/0294073 | A1 * | 11/2010 | Ehrenreich et al. | 74/502.2 |

* cited by examiner

*Primary Examiner* — Kevin Hurley
(74) *Attorney, Agent, or Firm* — Albert Bordas, P.A.

(57) ABSTRACT

An elliptical stroller assembly including a stroller frame assembly with a stroller assembly mounted thereto, first and second wheel assemblies, a propulsion frame assembly and propulsion assembly. The propulsion frame assembly and the propulsion assembly may be in an extended or in a retracted configuration with respect to the stroller frame assembly and the stroller assembly. In the extended configuration, the propulsion assembly propels the stroller frame assembly and the propulsion frame assembly is removably secured to a first fixed mount. In the retracted configuration, the propulsion assembly does not propel the stroller frame assembly. At this position, the propulsion frame assembly is removably secured to a second fixed mount.

20 Claims, 8 Drawing Sheets

ELLIPTICAL STROLLER ASSEMBLY

BACKGROUND OF THE INVENTION

1. Field of the Invention

The present invention relates to strollers, and more particularly, to elliptical stroller assemblies.

2. Description of the Related Art

Applicant is not aware of any apparatus designed to transport a person within a stroller that may be propelled with an elliptical propulsion assembly.

SUMMARY OF THE INVENTION

The instant invention is an elliptical stroller assembly, comprising a stroller frame assembly. A first wheel assembly is mounted to the stroller frame assembly and a propulsion assembly. A propulsion frame assembly is mounted to the stroller frame assembly and the propulsion assembly. The propulsion assembly has left and right pedal assemblies mounted onto respective first and second fixed axles. The left and right pedal assemblies are mechanically connected to a crank assembly and a gear system.

The propulsion frame assembly is in an extended configuration when the stroller frame assembly is propelled by the propulsion assembly; and is in a retracted configuration when the stroller frame assembly is not propelled by the propulsion assembly. The propulsion frame assembly comprises an interior tube that is secured to a first fixed mount when the propulsion frame assembly is in an extended configuration, and the propulsion frame assembly further comprises an exterior tubular section, which is secured to a second fixed mount when the propulsion frame assembly is in a retracted configuration.

The crank assembly and the gear system are mechanically connected to a second wheel assembly. The stroller frame assembly comprises a handle bar, and a casing mount having a bearing casing thereon. The interior tube is removably secured to the first fixed mount, which is mounted onto a connecting member affixed to the stroller frame assembly. The propulsion frame assembly further comprises the interior tube, the exterior tubular section, and a fork connector. The fork connector mounts to a second wheel assembly. The interior tube and the exterior tubular section are telescopic.

A housing comprises a notch extending from an upper limiting surface to a lower limiting surface. The housing further comprises a cavity extending from a first distal end of the upper limiting surface to a second distal end of the lower limiting surface. The cavity is self-lubricating. The gear system comprises an adjustable frame member having a predetermined shape at its distal end to fill the cavity. A connecting member extends between the bearing casing and the housing. The second wheel assembly is mounted to the propulsion frame assembly. The first wheel assembly comprises at least one front wheel assembly and at least one intermediate wheel assembly. The at least one intermediate wheel assembly is in between the at least one front wheel assembly and the second wheel assembly. The at least one intermediate wheel assembly comprises first and second intermediate wheel assemblies, the first and second intermediate wheel assemblies each have a respective axle. The left and right pedal assemblies each have respective sleeves that rotatably mount onto the respective first and second fixed axles.

It is therefore one of the main objects of the present invention to provide a stroller that may be propelled with an elliptical propulsion assembly.

It is another object of this invention to provide an elliptical stroller assembly that is in an extended configuration when the stroller frame assembly is propelled by the propulsion assembly.

It is another object of this invention to provide an elliptical stroller assembly that is in a retracted configuration when the stroller frame assembly is not propelled by the propulsion assembly.

It is another object of this invention to provide an elliptical stroller assembly that can be used as an elliptical exercise machine while transporting a person, pet, or thing in a stroller when in the extended configuration.

It is another object of this invention to provide an elliptical stroller assembly that can be used as a more traditional style stroller when the propulsion assembly is in the retracted configuration.

It is another object of this invention to provide an elliptical stroller assembly that is volumetrically efficient for carrying, transporting, and storage.

It is another object of this invention to provide an elliptical stroller assembly that can be readily placed into the retracted configuration and extended configuration, and vice-versa, without any special tools.

It is another object of this invention to provide an elliptical stroller assembly that is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
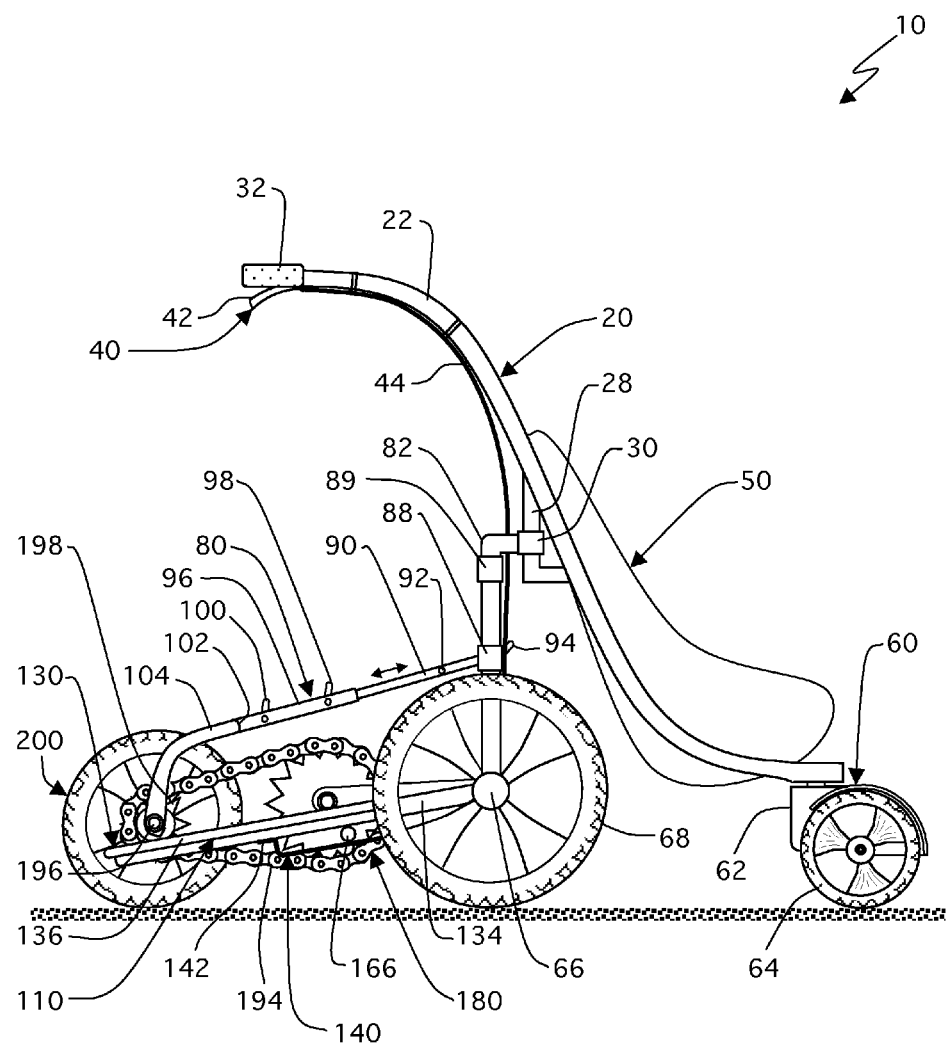
FIG. 1 represents a side elevational view of an elliptical stroller assembly, object of the instant invention, when the propulsion frame assembly is in the extended configuration.

Referring now to the drawings, the present invention is generally referred to with numeral 10. It can be observed that it basically includes stroller frame assembly 20, stroller assembly 50, wheel assembly 60, propulsion frame assembly 80, propulsion assembly 110, and second wheel assembly 200.

As seen in FIG. 1, propulsion frame assembly 80 is in an extended configuration. In the extended configuration, propulsion assembly 110 propels stroller frame assembly 20 when a person applies forces with his/her feet upon propulsion assembly 110 in an elliptical manner. Propulsion frame assembly 80 is mounted to stroller frame assembly 20 and propulsion assembly 110. Propulsion frame assembly 80 comprises interior tube 90, which is removably secured to fixed mount 88 when propulsion frame assembly 80 is in the illustrated extended configuration. Propulsion frame assembly 80 further comprises exterior tubular section 96 and fork connector 102. Wheel assembly 200 is mounted to propulsion frame assembly 80. As seen in this illustration, propulsion frame assembly 80 is in an extended configuration with respect to stroller frame assembly 20 and stroller assembly 50.

Figure 2:
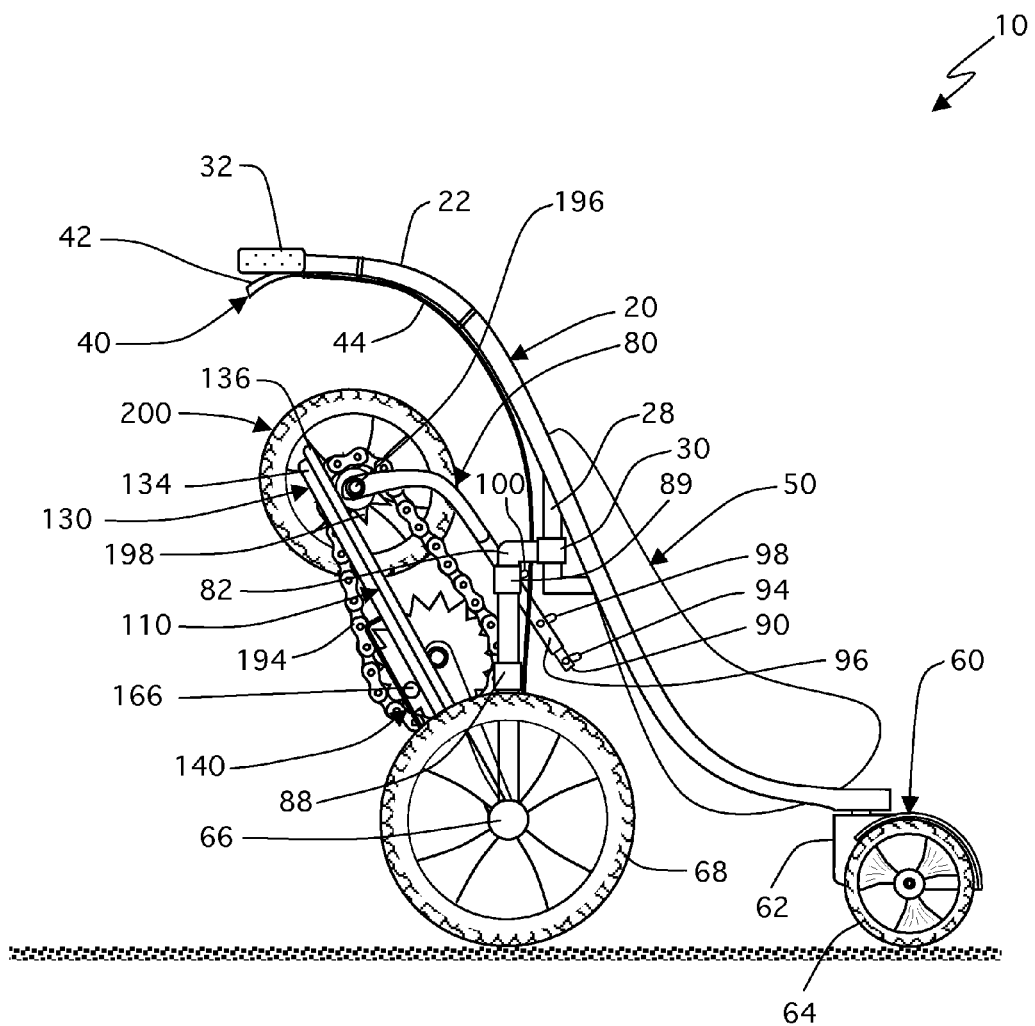
FIG. 2 is a side elevational view of the elliptical stroller assembly seen in FIG. 1, showing the propulsion frame assembly in the retracted configuration.

As seen in FIG. 2, propulsion frame assembly 80 is in the retracted configuration. In the retracted configuration, stroller frame assembly 20 is not propelled by propulsion assembly 110, but instead may be moved by a person applying a force at handle bars 22 and 22', and specifically at grips 32 and 32' seen in FIG. 3. In the retracted configuration, exterior tubular section 96 is removably secured to fixed mount 89 with locking pin 100. As seen in this illustration, propulsion frame assembly 80 is in the retracted configuration with respect to stroller frame assembly 20 and stroller assembly 50.

Figure 3:
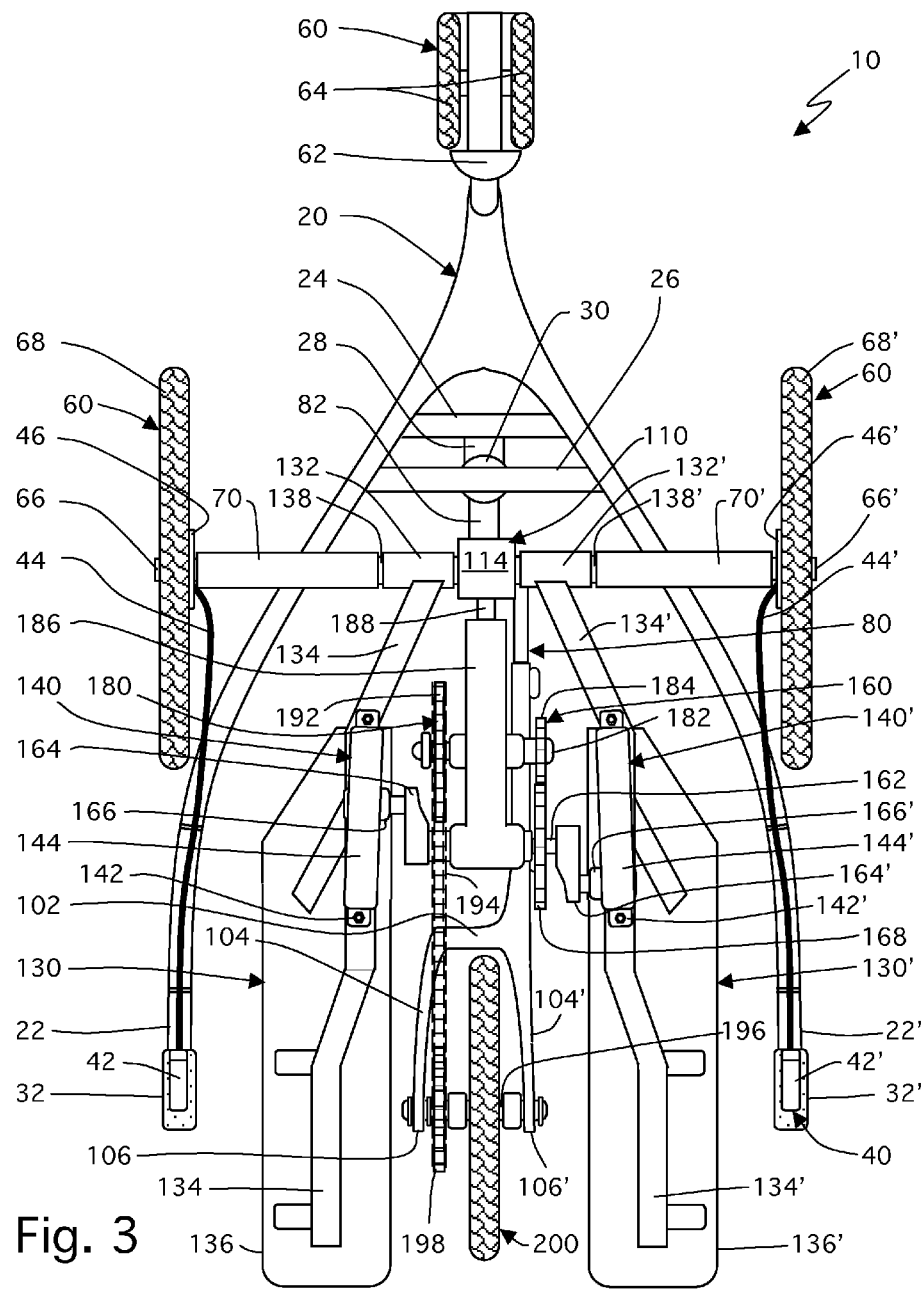
FIG. 3 is a bottom plan view of the invention in the extended configuration.
Figure 4:
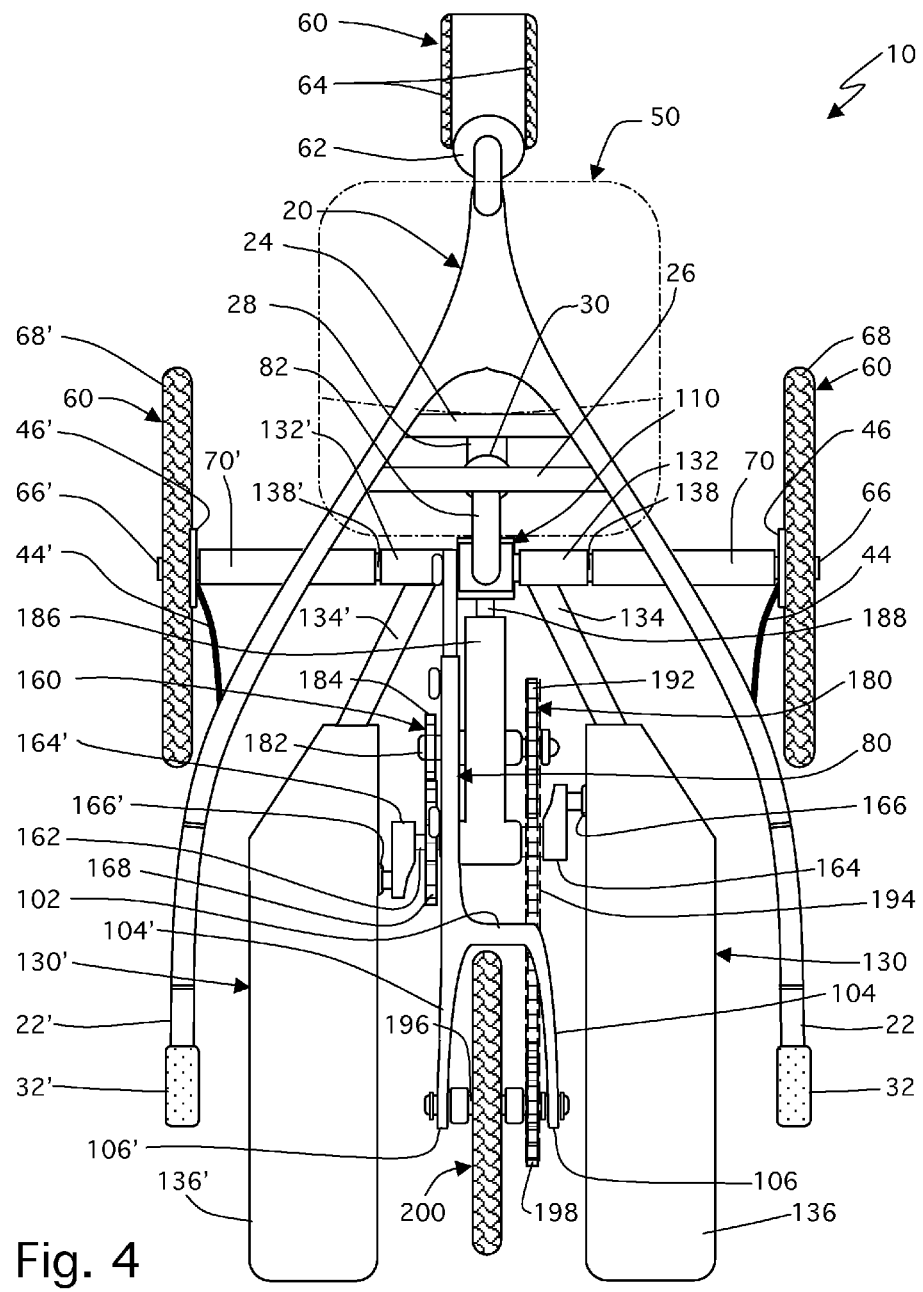
FIG. 4 is a top plan view of the invention in the extended configuration.

As seen in FIGS. 3 and 4, stroller frame assembly 20 comprises handlebars 22 and 22' with upper transversal supporting member 24 and lower transversal supporting member 26 mounted thereto. Casing mount 28 extends from upper transversal supporting member 24 to lower transversal supporting member 26. Bearing casing 30 is mounted to casing mount 28 to allow stroller frame assembly 20 to swivel/turn. Handlebars 22 and 22' have grips 32 and 32' respectively at their distal ends.

As best seen in FIG. 3, brake system 40 is mounted to stroller frame assembly 20 and wheel assembly 60. Brake system 40 comprises levers 42 and 42' at grips 32 and 32' respectively. Respective cables 44 and 44' extend from levers 42 and 42' to brakes 46 and 46'. Brakes 46 and 46' are mounted to wheel assembly 60.

Wheel assembly 60 is mounted to stroller frame assembly 20 and propulsion assembly 110. Wheel assembly 60 comprises caster assembly 62, front wheels 64, and an intermediate wheel assembly. The intermediate wheel assembly comprises intermediate wheels 68 and 68', each mounted on respective axles 66 and 66'. In the preferred embodiment, brakes 46 and 46' actuate upon wheels 68 and 68', respectively, when a user actuates levers 42 and 42'. Intermediate wheels 68 and 68' are positioned between front wheels 64 and wheel assembly 200. Wheel assembly 200 is mounted to propulsion frame assembly 80.

Propulsion assembly 110 has right and left pedal assemblies 130 and 130' mounted onto respective fixed axles 138 and 138'. Right and left pedal assemblies 130 and 130' are mechanically connected to crank assembly 160 and gear system 180. Crank assembly 160 and gear system 180 are in turn mechanically connected to wheel assembly 200. Gear system 180 comprises adjustable frame member 186 having neck 188.

Right and left pedal assemblies 130 and 130' have respective elongated connecting bars 134 and 134' connected to sleeves 132 and 132'. Mounted on elongated connecting bars 134 and 134' are pedals 136 and 136'. Sleeves 132 and 132' are mounted onto fixed axles 138 and 138'. Channel assemblies 140 and 140' are mounted to an underside of elongated connecting bars 134 and 134' with respective tabs 142 and 142', as best seen in FIG. 3. Channel assemblies 140 and 140' comprise elongated walls 144 and 144', which along with the underside of elongated connecting bars 134 and 134' define respective cavities that receive circular pedals 166 and 166' therein.

Wheel assembly 200 is mounted to fork connector 102 of propulsion frame assembly 80. Specifically, fork members 104 and 104' extend to both sides of wheel assembly 200, and ends 106 and 106' mount to wheel gear axle 196.

Adjustable frame member 186 has crank axle 162 and gear axle 182 mounted thereto at a spaced apart relationship from each other. Crank assembly 160 comprises crank axle 162 with crank arms 164 and 164' connected to its ends. Crank arms 164 and 164' rotate upon crank axle 162. Circular pedals 166 and 166' are rotatably mounted to the distal end of crank arms 164 and 164'. Crank sprocket 168 is also mounted to crank axle 162 between crank arm 164' and adjustable frame member 186. Crank sprocket 168 cooperatively connects gear sprocket 184 mounted to gear axle 182. Mounted to gear axle 182 is gear sprocket 192.

When a person applies forces with his/her feet upon propulsion assembly 110, and specifically pedals 136 and 136', in an elliptical manner, it causes crank arms 164 and 164' to rotate. Thus, causing crank sprocket 168 to rotate and gear sprocket 184 to rotate. The rotational force is then transmitted to gear sprocket 192. Chain 194 is mounted to gear sprocket 192 and wheel gear 198. Chain 194 turns wheel gear 198 therefore causing wheel assembly 200 to rotate and therefore propel instant invention 10.

Figure 5:
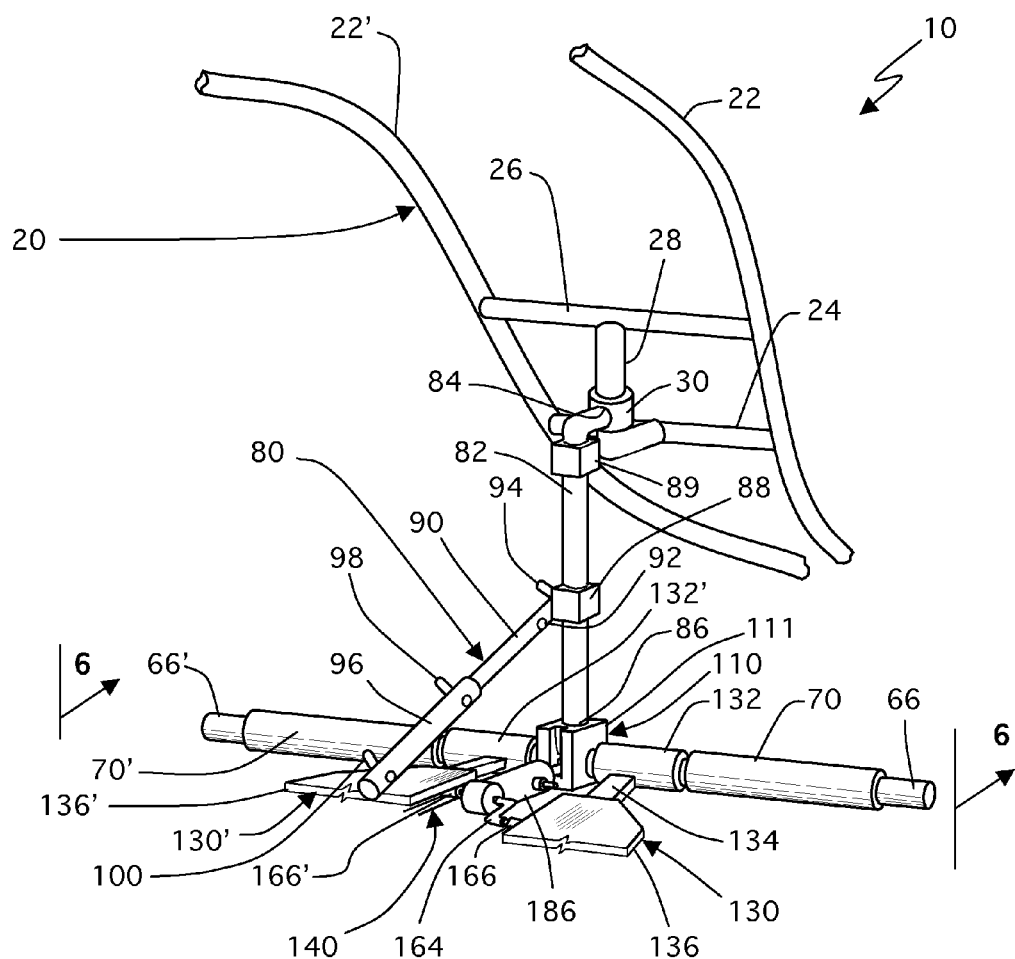
FIG. 5 is a partial isometric view of the stroller frame assembly and the propulsion frame assembly.

As best seen in FIG. 5, fixed mounts 88 and 89 are mounted onto connecting member 82. Stroller frame assembly 20 has casing mount 28 having bearing casing 30 mounted thereon. Connecting member 82 extends between bearing casing 30 and housing 111. Specifically, upper end 84 is mounted to bearing casing 30 and lower end 86 is mounted to housing 111. Interior tube 90 and exterior tubular section 96 are telescopically mounted.

Figure 6:
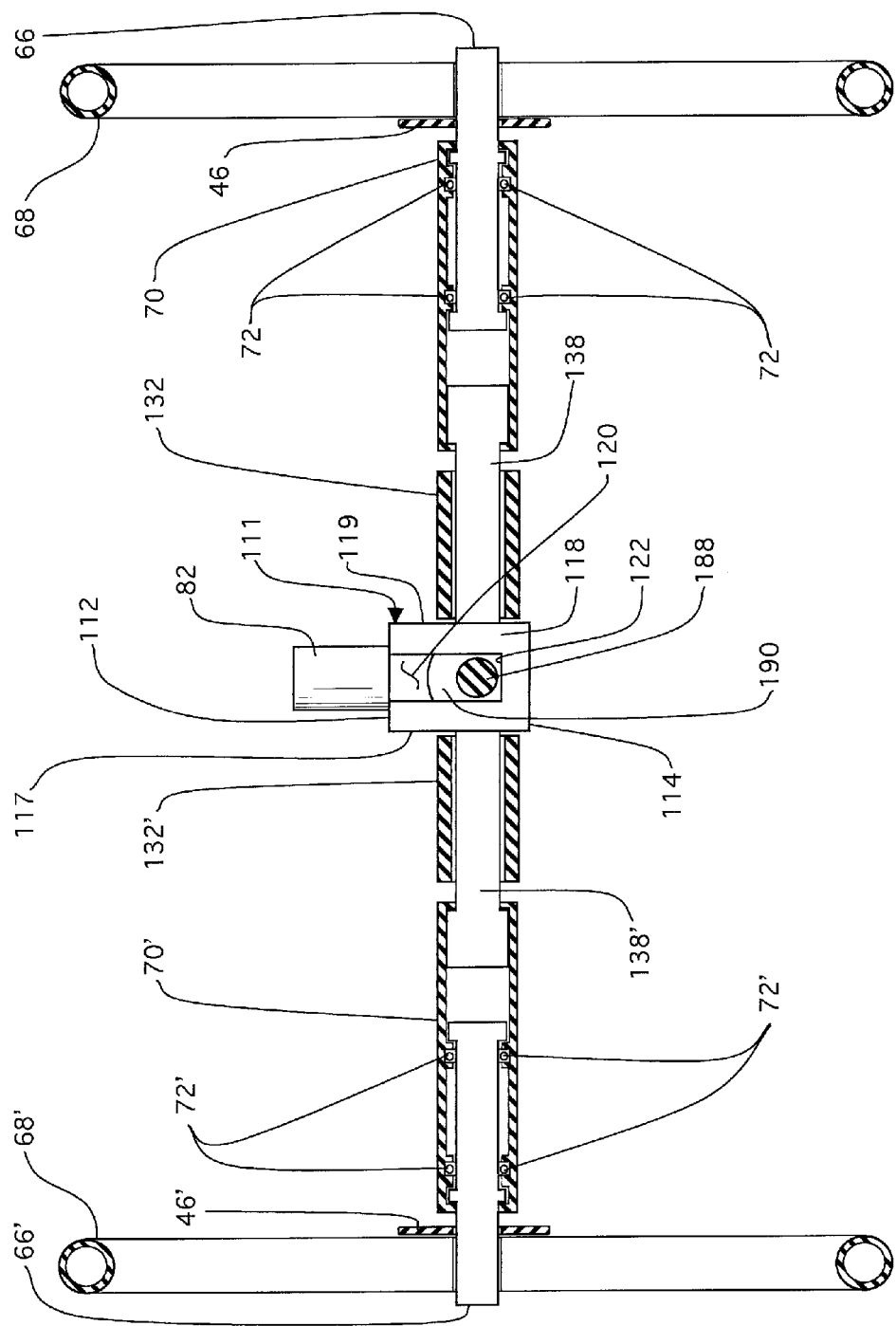
FIG. 6 is a cross section view taken along line 6-6 seen in FIG. 5.

As best seen in FIG. 6, fixed axles 138 and 138' protrude from or are affixed to sidewalls 117 and 119 of housing 111. Neck 188 of adjustable frame member 186 extends through notch 120 and terminates at ball 190 that is internally housed within housing 111. Sleeves 132 and 132' are rotatably mounted onto respective fixed axles 138 and 138'. Axle spacers 70 and 70' are fixedly mounted to distal ends of fixed axles 138 and 138' respectively. Axle spacers 70 and 70' are rotatably mounted to axles 66, and 66' and have bearings 72 and 72' respectively. Intermediate wheels 68 and 68' are mounted to respective axles 66 and 66'.

Figure 7:
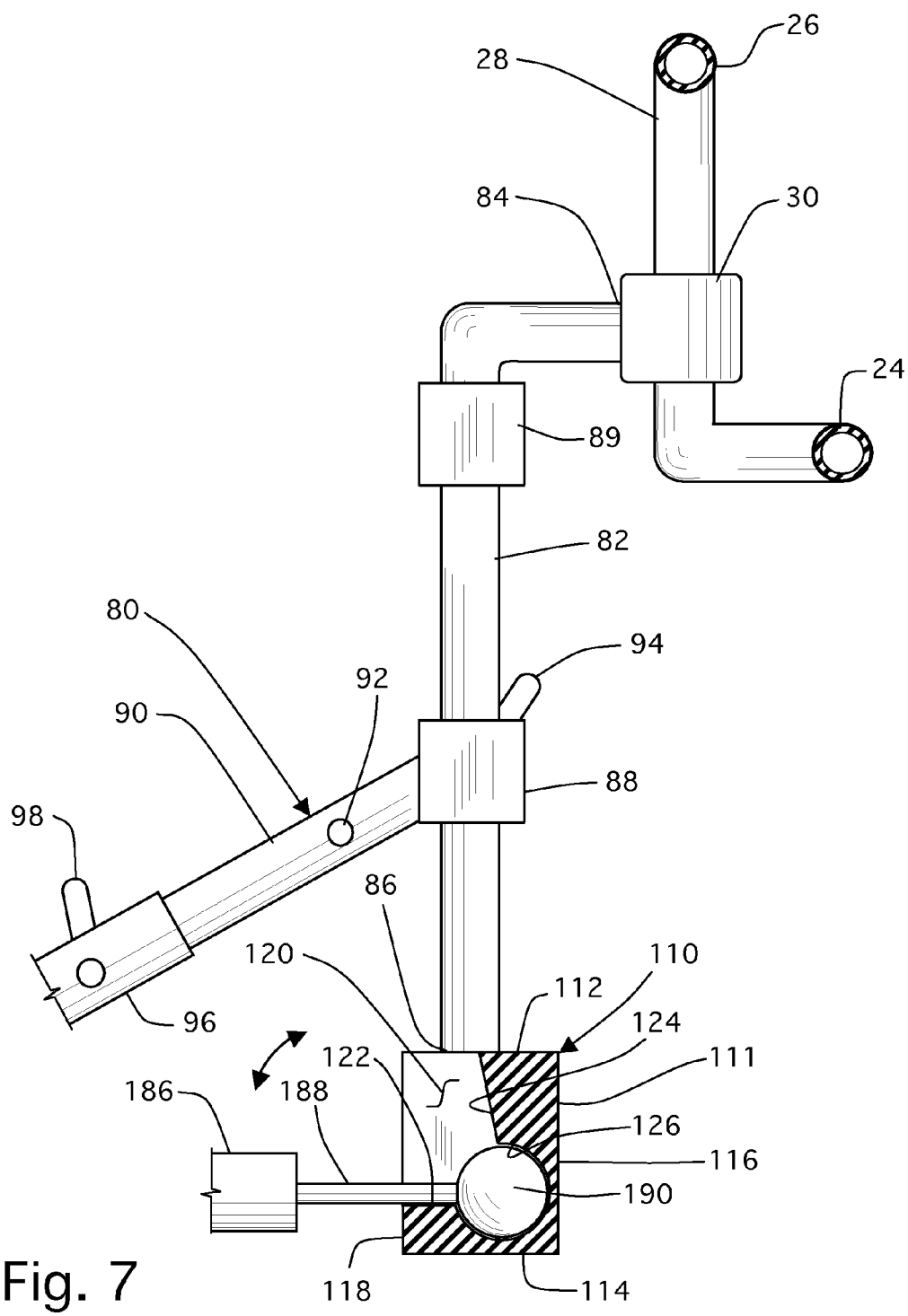
FIG. 7 is a side elevational view of the connecting member and housing, whereby the housing has been cross-sectioned to show its internal parts and neck and ball when the propulsion frame assembly is in the extended configuration.
Figure 8:
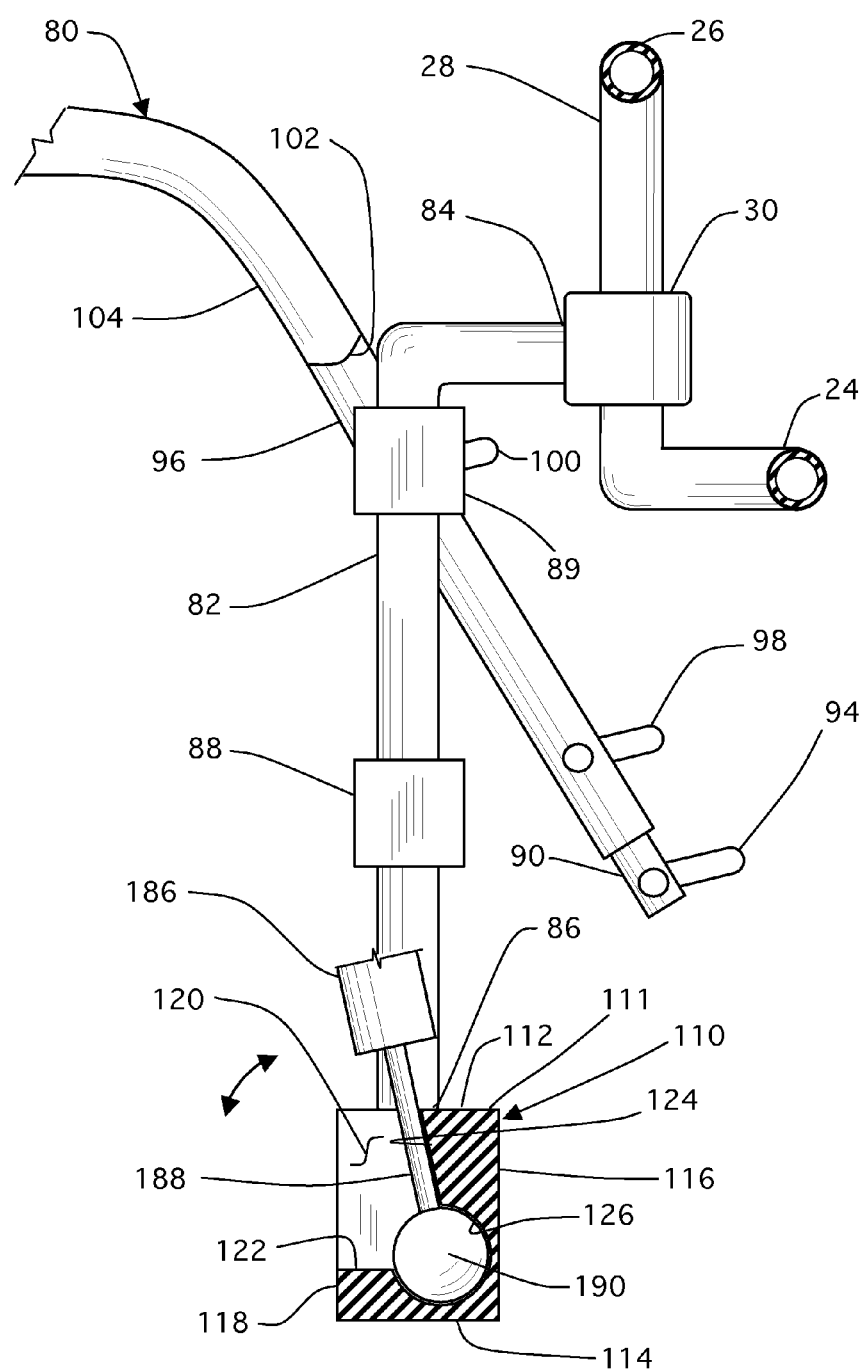
FIG. 8 is a side elevational view of the connecting member and housing, whereby the housing has been cross-sectioned to show its internal parts and neck and ball when the propulsion frame assembly is in the retracted configuration.

As seen in FIGS. 7 and 8, propulsion frame assembly 80 includes connecting member 82 with upper end 84 and lower end 86. Upper end 84 is mounted to bearing casing 30, and lower end 86 is mounted to housing 111.

As best seen in FIG. 7, fixed mount 88 is disposed at a first predetermined distance from lower end 86, in a way that interior tube 90 can be cooperatively secured thereto when propulsion frame assembly 80 is in an extended configuration. Locking pin 94 secures propulsion frame assembly 80 at this position. Propulsion assembly 110 further comprises housing 111. Housing 111 has top wall 112, bottom wall 114, front wall 116 and rear wall 118. Notch 120 extends from lower limiting surface 122 to upper limiting surface 124. Internally extending from the distal end of upper limiting surface 124 to the distal end of lower limiting surface 122 is semispherical cavity 126. Extending from adjustable frame member 186 is neck 188 with a cooperative shape and dimension to extend through notch 120. Ball 190 has a predetermined and cooperative shape and dimension to fill semispherical cavity 126. It is noted that the surface of semispherical cavity 126 and/or ball 190 is self-lubricating. As illustrated in the extended configuration, lower limiting surface 122 limits the downward position of adjustable frame member 186, and specifically of neck 188 within notch 120, to a predetermined position.

To place in the retracted configuration as seen in FIG. 8, locking pin 94 is released from fixed mount 88 and interior tube 90 is telescopically retracted inside exterior tubular section 96 until hole 92, seen in FIG. 7, reaches locking pin 98. Propulsion assembly 110 is then lifted and positioned to allow locking pin 100 to secure exterior tubular section 96 to fixed mount 89, thus securing propulsion frame assembly 80 in the retracted configuration. Fixed mount 89 is disposed at a second predetermined distance from lower end 86 in a way that exterior tubular section 96 can be cooperatively mounted thereto when propulsion frame assembly 80 is in the retracted configuration. In the retracted configuration, upper limiting surface 124 limits the upward movement of adjustable frame member 186, and specifically neck 188 within notch 120.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An elliptical stroller assembly, comprising:
   A) a stroller frame assembly;
   B) a first wheel assembly mounted to said stroller frame assembly and a propulsion assembly;
   C) a propulsion frame assembly mounted to said stroller frame assembly and said propulsion assembly; and
   D) said propulsion assembly having left and right pedal assemblies mounted onto respective first and second fixed axles, said left and right pedal assemblies mechanically connected to a crank assembly and a gear system.

2. The elliptical stroller assembly set forth in claim 1, further characterized in that said propulsion frame assembly is in an extended configuration when said stroller frame assembly is propelled by said propulsion assembly.

3. The elliptical stroller assembly set forth in claim 1, further characterized in that said propulsion frame assembly is in a retracted configuration when said stroller frame assembly is not propelled by said propulsion assembly.

4. The elliptical stroller assembly set forth in claim 1, further characterized in that said propulsion frame assembly comprises an interior tube, said interior tube is secured to a fixed mount when said propulsion frame assembly is in an extended configuration.

5. The elliptical stroller assembly set forth in claim 1, further characterized in that said propulsion frame assembly comprises an exterior tubular section, said exterior tubular section is secured to a fixed mount when said propulsion frame assembly is in a retracted configuration.

6. The elliptical stroller assembly set forth in claim 1, further characterized in that said crank assembly and said gear system are mechanically connected to a second wheel assembly.

7. The elliptical stroller assembly set forth in claim 1, further characterized in that said stroller frame assembly comprises a handle bar.

8. The elliptical stroller assembly set forth in claim 7, further characterized in that said propulsion frame assembly comprises an interior tube removably secured to a fixed mount, said fixed mount is mounted onto a connecting member affixed to said stroller frame assembly.

9. The elliptical stroller assembly set forth in claim 1, further characterized in that said propulsion frame assembly comprises an interior tube, an exterior tubular section, and a fork connector, said fork connector mounts to a second wheel assembly.

10. The elliptical stroller assembly set forth in claim 9, further characterized in that said interior tube and said exterior tubular section are telescopic.

11. The elliptical stroller assembly set forth in claim 7, further characterized in that said stroller frame assembly further comprises a casing mount having a bearing casing thereon.

12. The elliptical stroller assembly set forth in claim 11, further characterized in that said propulsion assembly comprises a housing, said housing comprises a notch extending from an upper limiting surface to a lower limiting surface, said housing further comprises a cavity extending from a first distal end of said upper limiting surface to a second distal end of said lower limiting surface.

13. The elliptical stroller assembly set forth in claim 12, further characterized in that said gear system comprises an adjustable frame member having a predetermined shape at its distal end to fill said cavity.

14. The elliptical stroller assembly set forth in claim 12, further characterized in that a connecting member extends between said bearing casing and said housing.

15. The elliptical stroller assembly set forth in claim 1, further characterized in that a second wheel assembly is mounted to said propulsion frame assembly.

16. The elliptical stroller assembly set forth in claim 6, further characterized in that said first wheel assembly comprises at least one front wheel assembly and at least one intermediate wheel assembly.

17. The elliptical stroller assembly set forth in claim 16, further characterized in that said at least one intermediate wheel assembly is in between said at least one front wheel assembly and said second wheel assembly.

18. The elliptical stroller assembly set forth in claim 12, further characterized in that said cavity is self-lubricating.

19. The elliptical stroller assembly set forth in claim 16, further characterized in that said at least one intermediate wheel assembly comprises first and second intermediate wheel assemblies, said first and second intermediate wheel assemblies each have a respective axle.

20. The elliptical stroller assembly set forth in claim 19, further characterized in that said left and right pedal assemblies each have respective sleeves that rotatably mount onto said respective first and second fixed axles.

* * * * *